United States Patent [19]

Oetiker

[11] Patent Number: 5,096,234
[45] Date of Patent: Mar. 17, 1992

[54] METHOD OF FASTENING HOSE TO NIPPLE AND HOSE CONNECTION OBTAINED BY SUCH METHOD

[75] Inventor: Hans Oetiker, Horgen, Switzerland

[73] Assignee: Hans Oetiker AG Maschinen- und Apparatefabrik, Horgen, Switzerland

[21] Appl. No.: 306,763

[22] Filed: Feb. 6, 1989

[51] Int. Cl.⁵ .............................................. F16L 33/20
[52] U.S. Cl. .................................. 285/256; 285/258; 29/506; 29/507; 29/508; 29/521
[58] Field of Search ........... 285/258, 256, 259, 382 A; 29/506, 507, 508, 521

[56] References Cited

U.S. PATENT DOCUMENTS

| | | | |
|---|---|---|---|
| 1,786,489 | 12/1930 | Hopkins | 285/256 |
| 1,825,005 | 9/1931 | Loughead | 285/256 |
| 2,025,427 | 12/1935 | Weatherhead, Jr. | 285/256 X |
| 2,216,839 | 10/1940 | Hoffman | 285/258 |
| 2,377,010 | 5/1945 | Howard | 285/258 X |
| 2,399,790 | 5/1946 | Conroy | 285/258 X |
| 2,595,900 | 5/1952 | Soos | 285/258 |
| 2,865,094 | 12/1958 | Press | 285/258 X |

FOREIGN PATENT DOCUMENTS

| | | | |
|---|---|---|---|
| 2532624 | 2/1977 | Fed. Rep. of Germany | 285/258 |
| 1089603 | 3/1955 | France | 285/258 |
| 1533335 | 7/1968 | France | 285/256 |
| 575057 | 1/1946 | United Kingdom | 285/258 |
| 1451588 | 10/1976 | United Kingdom | 285/256 |

*Primary Examiner*—Dave W. Arola
*Attorney, Agent, or Firm*—Paul M. Craig, Jr.

[57] ABSTRACT

A hose connection for high pressure installations and a method for making the same in which a nipple provided with externally projecting beads or ribs, preferably of annular configuration, is internally expanded by an expanding tool while the hose is constrained against radially outward movement by a sleeve-like member. To enhance the holding ability of the connection, the sleeve-like member is provided with inwardly extending annular grooves, preferably so arranged that the deepest point of the annular grooves are located between peaks of adjacent beads or rims.

17 Claims, 1 Drawing Sheet

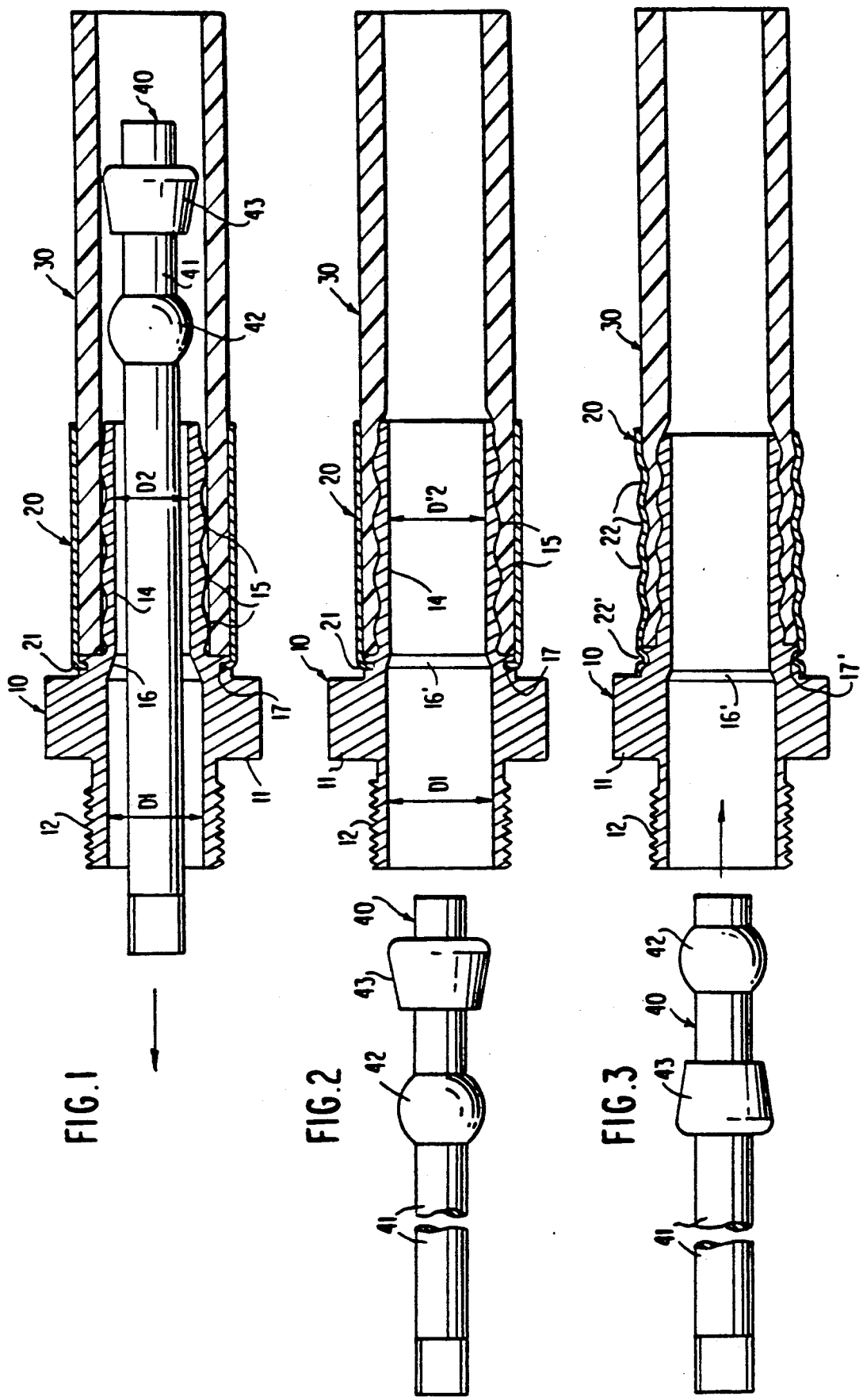

METHOD OF FASTENING HOSE TO NIPPLE AND HOSE CONNECTION OBTAINED BY SUCH METHOD

FIELD OF INVENTION

The present invention relates to a method for securely fastening a hose onto a nipple and to a hose connection with the nipple obtained by the use of such method.

PRIOR ART

Hose connections, particularly high pressure hose connections for use with heavy duty equipment such as road construction equipment which must be capable of withstanding relatively high pressures that are simple in construction and easy to install, have already received repeated attention heretofore. However, no simple solution capable of withstanding relatively high pressures have been available so far.

My own prior U.S. Pat. No. 3,870,349 offered the possibility of realizing extraordinarily good hose connections with high pressure hoses which proved superior to other hose connections on the market. A hose connection according to my aforementioned patent installed on both sides of certain hoses permitted to reach high pressures at which the hoses burst. However, apart from the fact that the hose connection according to my aforementioned prior patent was relatively costly, it was not possible by the use thereof at both ends of a hose to realize hose connections which reliably assured bursting of all available hoses and to maintain complete tightness up to the bursting pressure of a given hose.

Additionally, the high pressure hose connections available on the market which came to my attention, utilized beads at the nipple and/or the outer sleeve-like member that had sharp edges, apparently required to obtain a sufficient retaining action, even though such sharp edges were inadequate to maintain tightness up to the bursting pressure of the hose. However, such sharp edges entail the disadvantage that a part of the hose material may already be destroyed by cutting the hose material during the installation of the hose connection.

I have now discovered that the drawbacks encountered with the prior art hose connections can be avoided in a surprisingly simple manner by utilizing a nipple provided with externally projecting beads or ribs which is expanded after the hose is mounted over the nipple while confined in the radially outward direction by a sleeve-like member.

The U.S. Pat. No. 2,634,786 to Stinchcomb et al. discloses a method of mounting nipple hose couplings which is directed to relatively thin metal nipples. To permit free movement of the in-turned flange of the nut, this patent proposes the use of unribbed nipples into which circumferential ribs are formed by the use of an expansion member after a ferrule has been placed over the end of the hose and the smooth cylindrical nipple has been pushed into the hose. The method disclosed in this patent is relatively complicated as it requires, in addition to the expansion member, a mandrel member 15 as well as means to hold the expansion member in place while the tapering part of the mandrel member is pulled through the expansion member. Furthermore, the internal diameter of the nipple stays the same so that a distinct step remains at the free end of each nipple which depends on the thickness of the nipple material. The nipples of this patent, however, are made of thin metal so that such flow losses are not as serious as with more solid nipples.

The U.S. Pat. No. 3,428,338 to Corwin discloses a mechanical joint between tubes and a header of a heat-exchanger device which avoids the need for brazing or welding. Shallow annular grooves are provided in each bore of the header with the bore diameter slightly greater in diameter than the external diameter of the tubes. After the tubes are inserted into the bores, the portion of the tubes within the bores is expanded by the use of an expanding tool which forces metal of the tubes into grooves to form a positive mechanical interlock between the tubes and the header plate. To provide a seal, an impacting tool is then used to upset the inner end of a respective tube. However, there is no suggestion in this patent that a high pressure hose connection can be obtained by expanding a nipple, as proposed by the present invention.

The U.S. Pat. No. 3,812,704 to Kowal relates to an apparatus for making an expandable insert fitting which utilizes a duct between a deformable insert and a rigid annular shell. The fitting further includes a nut member with an in-turned outer flange holding the annular shell in place when screwed together with the external thread of a housing portion. The shell is provided with a ribbed internal surface whereby the duct end is sealingly clamped against this ribbed surface by radial expansion of the inner portion of the deformable insert. The insert itself is provided with a barbed outer surface offering sharp edges. Apart from the fact that the fitting of this patent is relatively complicated and expensive to manufacture by the requirement of ribbed surfaces in the annular shell, the saw-tooth-like barbs also would pose a problem in damaging elastic hoses made of rubber or similar material.

A pressurized fluid coupling and method of manufacturing the same is disclosed in the U.S. Pat. No. 4,773,679 to Hangebrauck in which beads are formed by compression with the use of a punch mechanism after grooves are rolled into the metal tube to create alternating regions of differing hardness in the metal tube for the subsequent formation of the beads by compressive action. However, there is no suggestion in this patent that a high pressure hose connection can be obtained by mere internal expansion of a nipple provided with ribs or beads.

The U.S. Pat. No. 3,595,047 to Fanning et al. discloses a method for forming grooves in a relatively thin-walled tube by expanding the tube within a die by the radially outwardly directed forces of a resilient member compressed by a plunger which causes the thin walls of the tubing to deform radially outwardly. However, there is no suggestion for the hose connection of the present invention.

The U.S. Pat. No. 4,573,340 to Kammeraad relates to a broaching tool for expanding valve guides. However, there is no suggestion in this patent that a broaching tool can be used for making a high pressure hose connection.

SUMMARY OF THE INVENTION

The method for fastening a hose onto a nipple provided with an externally ribbed or beaded nipple portion involves the step of expanding the inner diameter of the externally ribbed nipple portion while simultaneously confining the hose against radially outward movement by a tubular, sleeve-like member extending over the nipple portion. If a particularly heavy-duty hose connection is desired, radially inwardly extending annular grooves are rolled into the sleeve-like member, preferably so located in relation to the annular ribs or beads that the deepest points of the annular grooves occur at least approximately within the spaces of peaks of adjacent ribs or beads. The sleeve-like member may thereby be connected to the nipple by flanging, crimping or upsetting or by rolling the sleeve-like member into an annular groove provided in the nipple which may take place at the time annular grooves are rolled into the sleeve-like member to increase the holding ability of the connection.

The hose connection of this invention basically comprises only two elements; namely, a nipple with a nipple portion provided with axially spaced, externally projecting beads or ribs and a tubular sleeve-like member fixed to the nipple whereby the hose is held in place by expanding the inner diameter of the nipple portion. The sleeve like member may thereby be provided with radially inwardly extending annular grooves located between adjacent ribs or beads to further enhance the holding ability of the hose connection.

The method for fastening the hose onto a nipple and the hose connection with the nipple according to the present invention are relatively simple and inexpensive, yet provide complete tightness at unexpectedly high pressures in a reliable manner, even with reinforced hoses. Additionally, flow losses are reduced by the present invention which minimizes the differences between the normal inner diametric dimension of the hose and the diametric dimension of the nipple over which the hose is mounted.

BRIEF DESCRIPTION OF THE DRAWINGS

These and other objects, features and advantages of the present invention will become more apparent from the following description when taken in connection with the accompanying drawing which shows, for purposes of illustration only, two embodiments in accordance with the present invention, and wherein:

FIG. 1 is a somewhat schematic cross-sectional view of one embodiment in accordance with the present invention prior to expansion of the inner diameter of the nipple portion;

FIG. 2 is a cross-sectional view, similar to FIG. 1, showing the various parts thereof after completion of the inner diameter of the nipple portion; and FIG. 3 illustrates a modified embodiment of a hose connection and method of making the sam in accordance with the present invention.

DETAILED DESCRIPTION OF THE DRAWINGS

Referring now to the drawing wherein like reference numerals are used to designate like parts throughout the various views, and more particularly to FIG. 1, the nipple generally designated by reference numeral 10 includes a main portion 11 whose external surface is shaped to cooperate with a tool such as a socket wrench. The main portion 11 is integral with an externally threaded connecting portion 12. A nipple portion 14 extends from the main portion 11 opposite the connecting portion 12 whose internal diameter D2 is smaller than the internal diameter D1 of the main portion 11 and connecting portion 12 by an amount determined by the conical portion 16. The nipple portion 14 is additionally provided with outwardly extending annular beads or ribs 15 which have a rounded-off profile to avoid any sharp edges that might damage the hose by cutting. As can be seen in FIG. 1, both the peaks and troughs of the annular beads or ribs 15 are rounded-off in any appropriate manner. The conical portion 16 is relatively short in relation to the axial length of the main portion 11 and the nipple portion 14, is located axially offset from the main portion 11 in direction toward the nipple portion 14 and of a thickness in the radial direction considerably less than that of the main portion 11 and of the same order as the maximum thickness of the annular beads or ribs 15.

A sleeve-like member generally designated by reference numeral 20 is affixed to the nipple 10 by means of the bent-off end 21 extending into recess 17 provided therefor in the nipple 10. The fixing of the sleeve-like member 20 at the nipple 10 may take place by any known means such as crimping, upsetting, flanging and the like. The hose generally designated by reference numeral 30 which is made from any suitable hose material is located within the space between the nipple portion 14 and the sleeve-like member 20. The inner diameter of the sleeve-like member 20 and the outer diameter of the annular beads or ribs 15 is thereby so selected that the hose 30 can be slipped into the space over the nipple portion 14 or the nipple portion can be inserted into the hose 30 with the sleeve-like member 20 in place over the hose 30.

Reference numeral 40 generally designates an expanding tool which includes a rod 41 on which are mounted the expanding member or members 42, 43 made of any suitable hardened material. It is preferable to utilize several expanding members of increasing external dimensions so that the expansion of the nipple portion 14 can be realized in several steps with the absolute value of expansion during each step being thus smaller than would be required if a single expanding member were used. The expanding members 42 and 43 may thereby be of, for example, spherical configuration or conical configuration as shown. The number thereof can be chosen at will depending on existing conditions. Furthermore, the expanding members may all be of the same shape, spherical or conical, or may be some spherical and some conical. For convenient mounting of the expanding members 42, 43, the rod is externally threaded so that the expanding members can be held in predetermined positions by the use of nuts (not shown). However, any other known method of fastening the expanding members 42, 43 on rod 41 may be used. Additionally, the expanding member(s) may be made in one piece with the rod.

For purposes of installation, the sleeve-like member 20 is slipped over the hose 30, from the left end thereof as viewed in FIG. 1 so as to be over the hose 30 within the area of the free (left) end thereof.

The rod 41 of the expanding tool 40 is extended from the right as viewed in FIG. 1 through the nipple 10 and the nipple portion 14 is then inserted into the hose 30 so that the parts assume the position shown in FIG. 1. The sleeve-like member 20 may at this point be fixed to the nipple 10 as shown in FIG. 1 or may be fixed thereto after expanding the nipple portion 14 as will be described more fully hereinafter. By a suitable tool, the rod 41 is then pulled toward the left as indicated by the arrow in FIG. 1 so that the expanding members 42 and 43 will sequentially expand the inner diameter of the nipple portion 14 until it has the inner diametric dimension D2′ as shown in FIG. 2. As can also be seen from FIG. 2, the expanded internal diametric dimension D′2 is slightly smaller than the internal diametric dimension D1 so that a small tapered portion 16′ remains. This facilitates the expanding operation which is the more difficult the thicker the material. To increase the holding ability of the hose connection, the sleeve-like member 20 may then be provided additionally with inwardly extending annular grooves 22 as will be described more fully hereinafter by reference to FIG. 3. As can be seen by comparing FIG. 2 with FIG. 1, the difference between the diametric dimensions D1 and D2 of FIG. 1 is greater than the difference between the diametric dimensions D1 and D2′ of FIG. 2 so that the flow losses which occur as a result of the conical surface 16 are reduced in the completed hose connection of FIG. 2 and the inner diametric dimension D2 of the nipple portion 14 corresponds more closely to the inner diameter D1 which essentially corresponds to the normal inner diameter of the hose 30.

FIG. 3 illustrates a modified embodiment in accordance with the present invention in which the sleeve-like member 20 is secured to the nipple 10 by rolling-in an annular groove 22′ to engage in annular groove 17′ provided therefor in the nipple 10 and rolling-in the annular grooves 22 to increase the holding ability of the hose connection. As can be seen also from FIG. 3, the greatest depth of the annular rolled-in grooves 22 are thereby located between the peaks of the annular beads or ribs 15 in the nipple portion 14 so as to maximize the holding ability of the hose connection. Additionally, FIG. 3 differs from the embodiment of FIGS. 1 and 2 in that the expanding is realized by pushing the tool 40 into the nipple 10 which requires that the position of the smaller expanding member 42 relative to the larger expanding member 43 is reversed compared to that in FIG. 1. Conventional means may thereby be used in FIGS. 1-3 to apply the necessary force to the tool 40 while holding the nipple 10 in place. For use in the field, a manual tool utilizing a corkscrew-type mechanism can be used. For automated mass production other conventional means may be used to install the hose connection.

In a typical example, a hose reinforced with a nylon fabric and made by the Gates Rubber Company of Denver, Colorado, was used. This hose had an outside diameter of about 27 mm. and an inside diameter of about 19 mm. The nipple with an outside 25 diameter of about 20 mm. was inserted into this hose. The nipple can thereby be machined from a single piece of stock. In the alternative, the nipple portion 14 can be made of tubular stainless steel and can then be assembled with the main part 11. Additionally, it may be advantageous to make the nipple 10 from a malleable casting.

The special tool 40 consisting of rod 41 and one, two or more spherical members 42 and/or cone-shaped members 43 is then inserted into the hose 30 whereupon the nipple 10 is placed over the rod 41 and is thereafter inserted into the hose 30. The expanding members 42 and 43 can be secured on the rod 41, for example, by nuts (not shown) located on both sides of a respective expanding member and threadably engaging external threads provided on the rod 41. However, any other manner of securing the expanding members 42 and 43 can also be used which will hold the same in place. In the described example, the inner diameter of the nipple portion 14 which originally had a value of 15 mm. was expanded by the expanding tool 40 to 18 mm. Thereafter, the sleeve-like member 20 was fixed to the nipple 10 by rolling-in the annular groove 22′ and the annular grooves 22 were then formed in the sleeve-like member 20 by any known means. The hose of this example which included hose connections according to this invention at both ends thereof of the type shown in FIG. 3, burst at a pressure of 850 bar without any adverse influence on the hose connection itself.

The most varied materials such as steel, stainless steel, brass, bronze, aluminum, plastic material, etc. may be used as materials for the various parts of the hose connection in accordance with the present invention.

Hose connections which do not need to withstand very high pressures can also be made without the use of the annular grooves 22 in FIG. 3, though such grooves are also preferable for very high pressures with connections of the type shown in FIG. 2.

A hose connection in accordance with the present invention thus offers the significant advantage that the hose will burst, even in case of a reinforced hose before the nipple is expelled with great force and high velocity by the very high pressures in the hose. Tests have indicated that hose connections in accordance with the present invention reliably satisfy these requirements under all conditions.

As also pointed out above, this invention offers the enormous advantage that the inner diameter of the nipple portion no longer reduces the medium passage therethrough as was the case with the prior art connections of this type owing to the radially outward expansion of the nipple portion. In other words, if a certain required quantity of hydraulic or pneumatic medium has to pass through the hose within a given period of time in order to be able to carry out a certain work, it is possible to carry out the same amount of work with a hose that may even have a smaller diameter, than with a hose of larger diameter. Stated differently, in order to carry out the same amount of work, it is possible to do so with hoses of smaller diameter by the use of the present invention than was possible heretofore with hoses of larger diameter. Hoses of smaller diameter are less costly and also more easy to handle and more flexible. Additionally, a small nipple for the hose connection is considerably less expensive than a larger nipple required for larger hoses.

The hose connection in accordance with the present invention also adapts itself readily to hose repairs in the field. This can be done even manually if the rod 41 of the tool is provided with a fine threaded portion. This is of great significance with heavy machinery such as road-building equipment whose hourly operating costs may well exceed $1,000.00 per hour. However, most significantly, the hose connection and method of installing the same not only offers a significant simplification in the field of hydraulic high pressure lines but assures a great safety to prevent accidents and catastrophes which might otherwise jeopardize human lives, for example, in heavy duty equipment, aircrafts, ships, etc.

Furthermore, the reliability of the hose connection in accordance with the present invention permits to the designing engineer to calculate the pressure required for a given job and to then select the hoses required to carry these pressures. Hoses which can withstand high pressures are of relatively little use if they cannot be connected to a nipple with complete safety as is the case with the present invention.

While I have shown and described only two embodiments in accordance with the present invention, it is understood that the same is not limited thereto but is susceptible of numerous changes and modifications as known to those skilled in the art. For example, the thickness and type of material used for the sleeve-like member 20 can be chosen to match the forces which it must be able to withstand. I therefore do not wish to be limited to the details shown and described herein but intend to cover all such changes and modifications as are encompassed by the scope of the appended claims.

I claim:

1. A method for fastening a hose onto a nipple structure provided with an externally ribbed nipple portion, comprising the steps in the following sequence of slipping a tubular sleeve-like member of cylindrical configuration over the free end of the hose, mounting the hose over the externally ribbed nipple portion, placing the sleeve-like member on the hose in such a position as to be substantially coextensive with the ribbed nipple portion, thereafter expanding the inner diameter of the externally ribbed nipple portion while the hose is confined against radially outward movement by the tubular sleeve-like member extending over the nipple portion, and thereupon forming at least one radially inwardly extending generally annular indentation of reduced diametric dimension in the sleeve-like member within the area of the nipple portion in such a manner that at least one such indentation is located between the end of the hose and a rib.

2. A method according to claim 1 wherein said nipple structure includes a main portion externally provided with a tool-engaging surface connected with the nipple portion by way of a conical portion and wherein diving said expansion the inner diameter of the nipple portion is expanded to a diametric dimension slightly smaller than the inner diameter of the main portion to leave a shortened conical portion between the main portion and the nipple portion.

3. A method according to claim 2, wherein the conical portion is located axially offset from the main portion and has a thickness of the order of the maximum thickness of the nipple portion.

4. A method according to claim 1, wherein the nipple portion is made of readily expandable material and is affixed to the main portion prior to connecting the hose thereto.

5. A method according to claim 1, further comprising the step of fixing the sleeve-like member to the nipple.

6. A method according to claim 5, wherein the sleeve-like member is fixed to said nipple prior to mounting the hose over the nipple portion.

7. A method according to claim 6, wherein the sleeve-like member is fixed to the nipple by upsetting, crimping, or flanging over.

8. A method according to claim 1, wherein the nipple portion is expanded substantially uniformly over its entire length to minimize differences between the normal inner diametric dimension of the hose and the inner diameter of the nipple portion so that flow losses are minimized.

9. A connection of a hose with a nipple made in accordance wit the method of claim 8.

10. A connection of a hose with a nipple made in accordance with the method of claim 1.

11. A method according to claim 1, wherein each indentation is in the form of radially inwardly extending annular groove.

12. A method according to claim 11, wherein each annular groove is formed by rolling-in.

13. A method according to claim 11, wherein the nipple portion is provided with spaced annular ribs, and wherein the radially inwardly extending annular grooves rolled into the sleeve-like member are so located in relation to the annular ribs that the deepest points of said annular grooves occur at least approximately within the spaces between peaks of adjacent ribs.

14. A method according to claim 13, wherein the nipple portion is expanded substantially uniformly over its entire length to minimize differences between the normal inner diametric dimension of the hose and the inner diameter of the nipple portion so that flow losses are minimized.

15. A connection of a hose with a nipple made in accordance with the method of claim 13.

16. A method according to claim 12, wherein the rolling-in of all inwardly extending grooves takes place during the same operational step.

17. A connection according to claim 16 wherein the nipple portion is expanded substantially uniformly over its entire length to minimize differences between the normal inner diameter of the hose and the inner diameter of the nipple portion.

* * * * *